United States Patent
Kasuga et al.

(10) Patent No.: US 7,973,840 B2
(45) Date of Patent: Jul. 5, 2011

(54) SOLID-STATE IMAGING DEVICE AND IMAGING SYSTEM

(75) Inventors: Shigetaka Kasuga, Osaka (JP); Takumi Yamaguchi, Kyoto (JP); Takahiko Murata, Osaka (JP); Takayoshi Yamada, Osaka (JP)

(73) Assignee: Panasonic Corporation, Osaka (JP)

( * ) Notice: Subject to any disclaimer, the term of this patent is extended or adjusted under 35 U.S.C. 154(b) by 769 days.

(21) Appl. No.: 11/946,987

(22) Filed: Nov. 29, 2007

(65) Prior Publication Data

US 2008/0129851 A1    Jun. 5, 2008

(30) Foreign Application Priority Data

Dec. 4, 2006   (JP) ................................. 2006-327381

(51) Int. Cl.
*H04N 3/14*   (2006.01)
*H04N 5/335*   (2006.01)

(52) U.S. Cl. ........ 348/294; 348/295; 348/296; 348/298; 348/312

(58) Field of Classification Search .................. 348/294, 348/295, 296, 298, 312; 250/208.1; 257/290–292, 257/191
See application file for complete search history.

(56) References Cited

U.S. PATENT DOCUMENTS

| | | | |
|---|---|---|---|
| 6,721,008 B2 * | 4/2004 | Lee et al. | 348/302 |
| 2005/0174452 A1 * | 8/2005 | Blerkom et al. | 348/294 |
| 2006/0102827 A1 | 5/2006 | Kasuga et al. | |
| 2006/0278948 A1 | 12/2006 | Yamaguchi et al. | |
| 2007/0046802 A1 * | 3/2007 | Ham et al. | 348/308 |
| 2007/0222867 A1 | 9/2007 | Murata et al. | |

FOREIGN PATENT DOCUMENTS

| JP | 2001-045375 | 2/2001 |
|---|---|---|
| JP | 2005-347932 | 12/2005 |

OTHER PUBLICATIONS

English language Abstract of JP 2005-347932.
English language Abstract of JP 2001-045375.

* cited by examiner

*Primary Examiner* — Yogesh K Aggarwal

(74) *Attorney, Agent, or Firm* — Greenblum & Bernstein, P.L.C.

(57) ABSTRACT

A solid-state imaging device includes: a plurality of pixels arranged in a matrix, the matrix defining columns of the pixels, and each of the pixels outputting an analog signal by performing photoelectric conversion; an analog-digital converter provided for each of columns which sequentially converts a plurality of analog signals outputted from the pixels in a column into a plurality of digital signals; a memory circuit provided for each column which includes memories and performs, in parallel, a process of storing a one of the digital signals in one of the memories and a process of outputting another of the digital signals previously stored in another of the memories; and data buses connected to the memory in each column.

10 Claims, 15 Drawing Sheets

SOLID-STATE IMAGING DEVICE AND IMAGING SYSTEM

BACKGROUND OF THE INVENTION (1) Field of the Invention

The present invention relates to a solid-state imaging device and an imaging system and, more particularly, to a Metal Oxide Semiconductor (MOS) solid-state imaging device which includes an analog-digital converter (ADC) for each of columns and can operate at high speed and an imaging system using such a solid-state imaging device.

(2) Description of the Related Art

There have recently been proposed many techniques for speeding up a MOS solid-state imaging device. Examples of the techniques include ones disclosed in Japanese Unexamined Patent Application Publication No. 2005-347932 (hereinafter referred to as Patent Document 1) and Japanese Unexamined Patent Application Publication No. 2001-045375 (hereinafter referred to as Patent Document 2).

The technique disclosed in Patent Document 1 will first be described.

Patent Document 1 discloses a MOS solid-state imaging device which includes a pixel unit composed of pixel circuits arranged in a matrix, each of which includes a photoelectric conversion element, and ADCs, each two or more of which are provided for each of columns of the matrix, and achieves higher-speed operation by sequentially reading out outputted signals as photoelectric conversion results from the pixel circuits in different rows of each column and processing, in parallel, the signals outputted by the corresponding two or more ADCs. Patent Document 1 also proposes a technique for achieving further speedup by providing a plurality of vertical signal lines for each of the columns and simultaneously reading out signals outputted from the pixel circuits in the different rows of each column.

With reference to FIGS. 1 to 6, the MOS solid-state imaging device disclosed in Patent Document 1 in which two ADCs are provided for each of the columns will be described below.

FIG. 1 is a block diagram showing a functional configuration of the solid-state imaging device. For illustrative simplicity, the description will be given using a pixel unit 11 which is composed of a plurality of pixel circuits 10 arranged in a matrix with three rows and six columns.

Outputs of the pixel circuits 10 in each column are commonly connected to a vertical signal line 12. A vertical scan circuit 13 sequentially outputs a read signal to the pixel circuits 10 in the rows. Upon receipt of a read signal, the pixel circuits 10 in each row output analog signals as photoelectric conversion results to the vertical signal lines 12.

Correlated double sampling circuits (hereinafter referred to as CDSs) 14 and 18 are each composed of individual circuits which are provided for the respective columns. The individual circuits in each column remove noise from the analog signals obtained from the pixel circuits in the different rows of the column. ADCs 151 and 191 are each composed of individual circuits which are provided for the respective columns. The individual circuits in each column convert the analog signals into digital signals after the noise removal in the CDSs 14 and 18.

The digital signals obtained after the conversion are sequentially outputted to the outside through data buses 17 and 21 one column at a time in accordance with selection signals from horizontal scan circuits 16 and 20. Since the data buses 17 and 21 transmit the digital signals obtained after the conversion, they can operate at high speed.

FIG. 2 shows a basic circuit configuration of an ADC 151 together with the data buses 17 and horizontal scan circuit 16. FIG. 2 shows circuits of the ADC 151 corresponding to three of the columns in a case where each of them is a single-slope integration analog-digital conversion circuit, and each digital signal is represented by three bits.

A portion of the ADC 151 corresponding to one column is made up of a comparator 22, a transfer switch 27 composed of three MOS transistors whose gates are connected to the output of the comparator 22, a memory 50 composed of three capacitances respectively connected to the three MOS transistors of the transfer switch 27, and a read switch 36 composed of three MOS transistors respectively connected to three capacitances of the memory 50. The ADC 151 includes the same circuits corresponding to the columns of the pixel unit.

A ramp generator 23 generates a single-slope ramp signal and supplies the signal to the comparators 22 through a signal line 24. A counter circuit 25 generates a counter code for counting a 3-bit value during a slope period of the ramp signal and supplies the counter code to the transfer switches 27 through signal lines 26.

The comparator 22 outputs a control signal to the transfer switch 27 when the level of the ramp signal and that of an analog signal supplied from the CDS 14 are equal. As a result, a value of the counter code is stored in the memory 50 through the transfer switch 27.

Gates of the three MOS transistors constituting the read switch 36 are connected to the horizontal scan circuit 16. The horizontal scan circuit 16 sequentially outputs a selection signal to the read switches 36 one column at a time, thereby sequentially outputting counter codes stored in the memories 50 in the columns to the outside through the data buses 17.

Note that the ADC 191, data buses 21, and horizontal scan circuit 20 are configured in the same manner as in the configuration shown in FIG. 2.

FIG. 3 is a diagram for conceptually explaining operation of a conventional solid-state imaging device. FIG. 3 schematically shows circuits corresponding to two of the columns of the solid-state imaging device in FIG. 1.

The vertical scan circuit 13 controls switches 38, such as MOS transistors, which are connected to the CDS 14 to be turned on when it supplies a read signal to the pixel circuits in one of the rows (e.g., A11 and A12). As a result, noise is removed from analog signals obtained from the pixel circuits in the row by the CDS 14, and the analog signals after the noise removal are converted into digital signals by the ADC 151.

The horizontal scan circuit 16 sequentially outputs a selection signal to the read switches 36 one column at a time to turn them on. With this operation, the digital signals obtained after the conversion in the ADC 151 are sequentially outputted to the outside through the data buses 17 one column at a time.

The vertical scan circuit 13 also controls switches 39 which are connected to the CDS 18 to be turned on when it supplies a read signal to the pixel circuits in another of the rows (e.g., A21 and A22). As a result, the noise is removed from the analog signals obtained from the pixel circuits in the row by the CDS 18, and the analog signals after the noise removal are converted into digital signals by the ADC 191.

In the above-described manner, the analog signals from the pixel circuits in different ones of the rows are distributed between upper and lower structures and are processed.

FIG. 4 is a timing chart for explaining operation timing. Two belts indicate times when series of operations for different ones of the rows, i.e., reading of analog signals from the pixel circuits in the different rows, noise removal by the CDSs, analog-digital conversion of the signals by the ADCs, and outputs of digital signals obtained after the conversion are performed. A direction from left to right in FIG. 4 corresponds to the passage of time.

Since each column has only one vertical signal line 12, a reading operation is sequentially performed for the rows one at a time. However, the other operations can be performed in parallel by the CDSs, ADCs, and data buses provided in two sets. This allows high-speed operation.

In order to achieve further speedup, two vertical signal lines 121 and 122 are provided for each of columns in a solid-state imaging device shown in FIG. 5. The vertical signal lines 121 connect the outputs of pixel circuits in odd-numbered rows to a CDS 14 while the vertical signal lines 122 connect the outputs of pixel circuits in even-numbered rows to a CDS 18. A vertical scan circuit 131 supplies a read signal simultaneously to the pixel circuits in one of the odd-numbered rows and those in one of the even-numbered rows.

With this configuration, all operations for two of the rows, including reading of the analog signals from the pixel circuits, can be simultaneously performed, as shown in FIG. 6. This allows higher-speed operation.

The technique disclosed in Patent Document 2 will be described next.

FIG. 7 is a circuit diagram showing a configuration of a solid-state imaging device disclosed in Patent Document 2.

The solid-state imaging device includes pixel circuits 1 and 2 arranged in a matrix, each of which includes a photoelectric conversion element, capacitance units 3 and 4 which accumulate, as analog charges, noise components before photoelectric conversion and optical signals as photoelectric conversion results from the pixel circuits 1 and 2, and switch circuits 5 and 6 which selectively output the noise components and optical signals stored in the capacitance units 3 and 4. The noise components are used for noise removal from a corresponding optical signal, and the noise removal can be achieved by subtracting the noise components from the corresponding optical signal.

According to the solid-state imaging device, for example, while noise components and optical signals from the pixel circuits 1 are accumulated in the capacitance units 3, noise components and optical signals from the pixel circuits in the other row which have been accumulated in the capacitance units 4 are outputted. After that, while noise components and optical signals from the pixel circuits 2 are accumulated in the capacitance units 4, the noise components and optical signals from the pixel circuits 1 accumulated in the capacitance units 3 are outputted. That is, it is possible to perform a process of alternately and in parallel accumulating and outputting the noise components and the optical signals from the pixel circuits in the different rows (referred to as background processing).

For this reason, the solid-state imaging device can cover up a horizontal blanking period for reading out noise components and optical signals from the pixel circuits in a row to the corresponding capacitance units with a period for outputting noise components and optical signals read out in advance from the pixel circuits in another row to the other capacitance units. As a result, it is possible to continuously output signals from the pixel circuits in the plurality of rows at high speed.

As described above, conventional solid-state imaging devices are effective to a certain degree in speeding up operation. Although the demand for higher-speed operation of solid-state imaging devices is expected to grow in the future along with a further increase in the number of pixels, it is difficult to meet the demand only by conventional techniques.

As measures for speedup, for example, an increase in an operating speed of the ADCs is conceivable for the solid-state imaging devices disclosed in Patent Document 1, and an increase in horizontal transfer rate is conceivable for the solid-state imaging device disclosed in Patent Document 2.

However, since circuits which are expected to be packed more densely in the future with an increase in the number of pixels need to be operated at higher speed while maintaining precision and stability, it is not always easy to take such measures. In particular, it is technically extremely difficult to take the measures in an analog circuit.

SUMMARY OF THE INVENTION

In order to overcome the aforementioned problems, an object of the present invention is to provide a technique for increasing an effective operating speed of a solid-state imaging device including an ADC provided for each of columns without increasing an operating speed of the ADCs.

In order to achieve the above object, a solid-state imaging device includes: a pixel unit which is made up of plural pixel circuits arranged in a matrix, each of the pixel circuits outputting an analog signal by performing photoelectric conversion; an AD conversion circuit, provided in each of columns, which converts plural analog signals outputted from the plural pixel circuits in a corresponding one of the columns into plural digital signals, and sequentially outputs the digital signals; a memory circuit, provided in each of the columns, which has plural memories and stores each of the plural digital signals in different ones of the plural memories, while outputting a digital signal already stored in others of the plural memories in parallel; and a horizontal transfer circuit connected to the memory circuits in each of the columns.

According to this configuration, it is possible to continuously perform, in parallel, a process of storing digital signals as AD conversion results in one of the memories and a process of transferring other digital signals stored in advance in another of the memories by the horizontal transfer circuit while interchanging roles of the memories. The increase in an operating rate of the AD conversion circuits achieves an increase in an effective operating speed of the solid-state imaging device.

For that purpose, the memory circuit in each of the columns may include: plural input selection switches each of which connects an output of the AD conversion circuit in a corresponding one of the columns and the different ones of the plural memories, and which is selectively turned on; and plural output selection switches each of which connects the different ones of the plural memories and the horizontal transfer circuit, one of the output selection switches being turned on, the turned-on output selection switch being connected to one of the memories other than the memory connected to one of the input selection switches that is turned on.

The AD conversion circuit may convert analog signals outputted from the pixel circuits in a second row, which is different from a first row, into digital signals while digital signals derived from the pixel circuits in the first row are sequentially transferred by the horizontal transfer circuit.

According to these configurations, since a horizontal blanking period for reading out and AD-converting analog signals from ones of the pixel circuits in a row can be covered up with a period for transferring the digital signals in another row which have been obtained in advance after the AD conversion, it is possible to continuously output the digital signals in each row.

The pixel circuits in a first row output analog signals by performing photoelectric conversion while the AD conversion circuit converts analog signals outputted from the pixel circuits in a second row, which is different from the first row, into digital signals. The AD conversion circuit starts converting the analog signals outputted from the pixel circuits in the first row into digital signals immediately after the AD conversion circuit finishes converting the analog signals outputted from the pixel circuits in the second row into digital signals.

According to this configuration, it is possible to further increase the operating rate of the AD conversion circuit. The configuration is helpful in further increasing the operating speed of the solid-state imaging device.

Plural circuit sets are provided, each of the circuit sets being made up of the horizontal transfer circuit and the AD conversion circuit and the memory circuit in each of the columns. Each of the circuit sets converts analog signals outputted from the pixel circuits in different rows into digital signals and sequentially transfers the digital signals after the conversion.

The solid-state imaging device includes plural vertical signal lines provided in each of the columns, each of which connects respective outputs of the plurality of pixel circuits in the column and different ones of the plural circuit sets. Each of the circuit sets acquires, in parallel, the analog signals outputted from the pixel circuits in the different rows via one of the plural vertical signal lines which is connected to the circuit set, converts the acquired analog signals into digital signals, and sequentially transfers the digital signals after the conversion.

According to these configurations, the plural circuit sets can perform, in parallel, a characteristic process of continuously performing the storing and the transfer of the digital signals as the AD conversion results in each row while interchanging the roles of the memories. Accordingly, the configurations are helpful in further increasing the operating speed of the solid-state imaging device.

By turning the AD conversion circuit into a single-slope integration analog-digital conversion circuit, a high performance conversion circuit having a simple circuit configuration can be realized.

Further, by providing a noise removal circuit in each of the columns, which removes noise from the analog signals outputted from the pixel circuits in a column and outputs the analog signals to the corresponding AD conversion circuit, a solid-state imaging device that generates less noise can be realized.

The present invention is not only realized as a solid-state imaging device but also as an imaging system including a solid-state imaging device as described above.

The solid-state imaging device according to the present invention can continuously perform, in parallel, the process of storing the digital signals obtained as the AD conversion results in one of the memories and the process of transferring other digital signals stored in advance in another of the memories by the horizontal transfer circuit while interchanging the roles of the memories. The increase in the operating rate of the AD conversion circuit achieves an increase in an effective operating speed of the solid-state imaging device.

FURTHER INFORMATION ABOUT TECHNICAL BACKGROUND TO THIS APPLICATION

The disclosure of Japanese Patent Application No. 2006-327381 filed on Dec. 4, 2006 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT(S)

With reference to the drawings, solid-state imaging devices according to embodiments of the present invention will be described below.

FIRST EMBODIMENT

Figure 8:
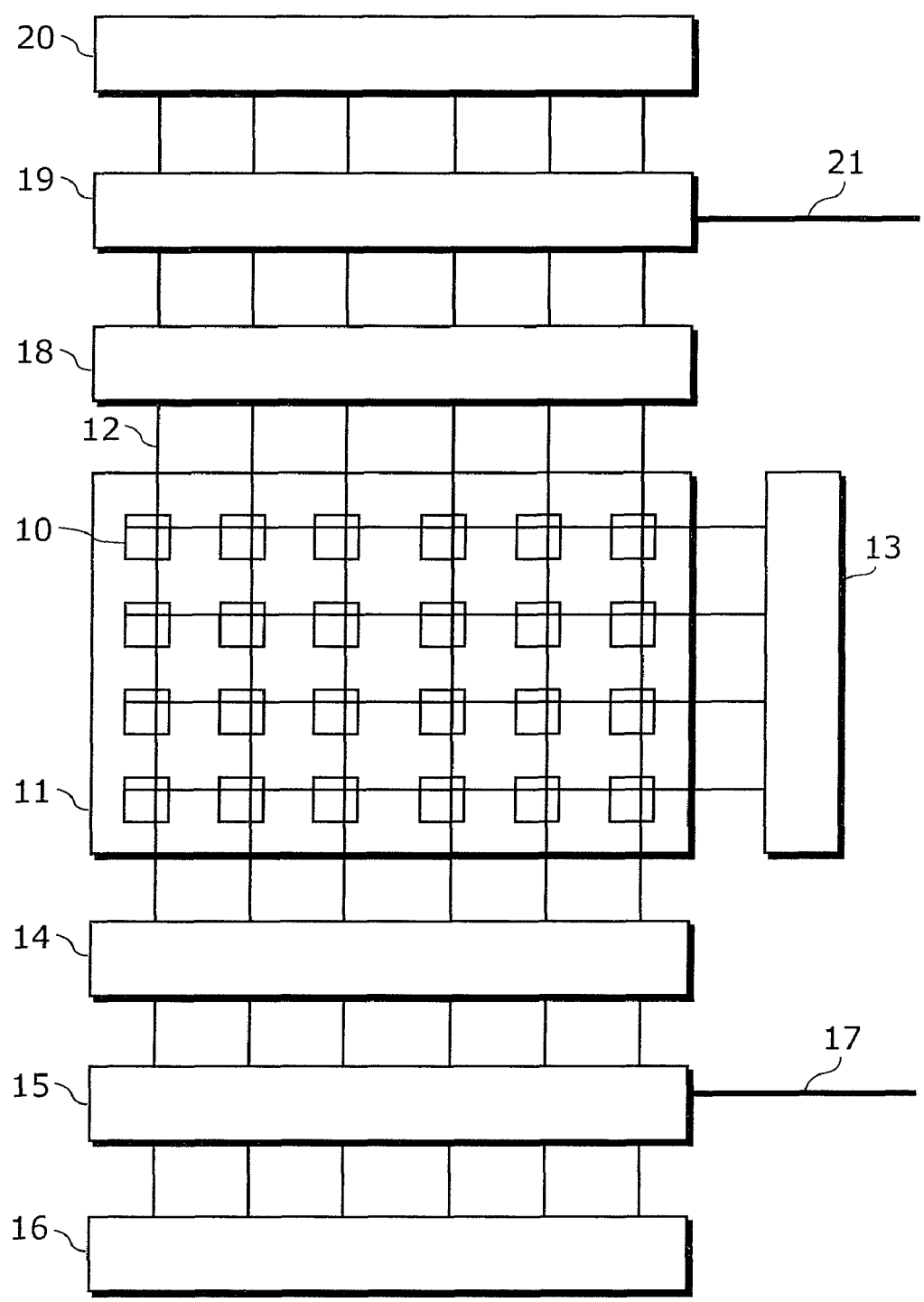
FIG. 8 is a block diagram showing a functional configuration of a solid-state imaging device according to a first embodiment.

FIG. 8 is a block diagram showing a functional configuration of a solid-state imaging device according to a first embodiment. For illustrative simplicity, the present embodiment will be described using a 6×4 pixel unit.

Pixel circuits 10 in rows sequentially output read-out analog signals to CDSs 14 and 18 which are provided on the two sides of a pixel unit 11 one row at a time under the control of a vertical scan circuit 13. The CDSs 14 and 18 perform noise removal on the analog signals, and ADCs 15 and 19 convert the analog signals into digital signals after the noise removal in the CDSs 14 and 18.

In the present embodiment, the ADCs 15 and 19 are each provided with memory circuits. In each memory circuit, a digital signal obtained as an AD conversion result is alternately stored in first and second memories. Configurations of the ADCs 15 and 19 will be described in detail later.

In the solid-state imaging device according to the present embodiment, the vertical scan circuit 13 first outputs a read signal to an odd-numbered one of the rows (e.g., a first row), and thereby analog signals obtained after photoelectric conversion are read out from the pixel circuits in the row. The CDS 14 performs noise removal on the analog signals. The ADC 15 converts the analog signals into digital signals after the noise removal and stores the digital signals in its first memories.

The vertical scan circuit 13 then outputs a read signal to an even-numbered one of the rows (e.g., a second row), and thereby analog signals obtained after photoelectric conversion are read out from the pixel circuits in the row. The CDS 18 performs noise removal on the analog signals. The ADC 19 converts the analog signals into digital signals after the noise removal and stores the digital signals in its first memories.

The vertical scan circuit 13 controls when to output the read signal to the odd-numbered row and when to output the read signal to the even-numbered row such that the analog signals are read from the pixel circuits in the even-numbered row immediately after reading of the analog signals from the pixel circuits in the odd-numbered row is completed.

Analog signals outputted from the pixel circuits in the next odd-numbered row (e.g., a third row) are inputted to the CDS 14, as in the case of the first row, and the ADC 15 stores digital signals obtained after digital conversion in its second memories. Analog signals outputted from the pixel circuits in the next even-numbered row (e.g., a fourth row) are inputted to the CDS 18, as in the case of the second row, and the ADC 19 stores digital signals obtained after digital conversion in its second memories.

The digital signals obtained after the conversion in the above-described manner are alternately read out from the first and second memories by horizontal scan circuits 16 and 20 and are transferred and outputted to the outside through data buses 17 and 21.

Figure 9:
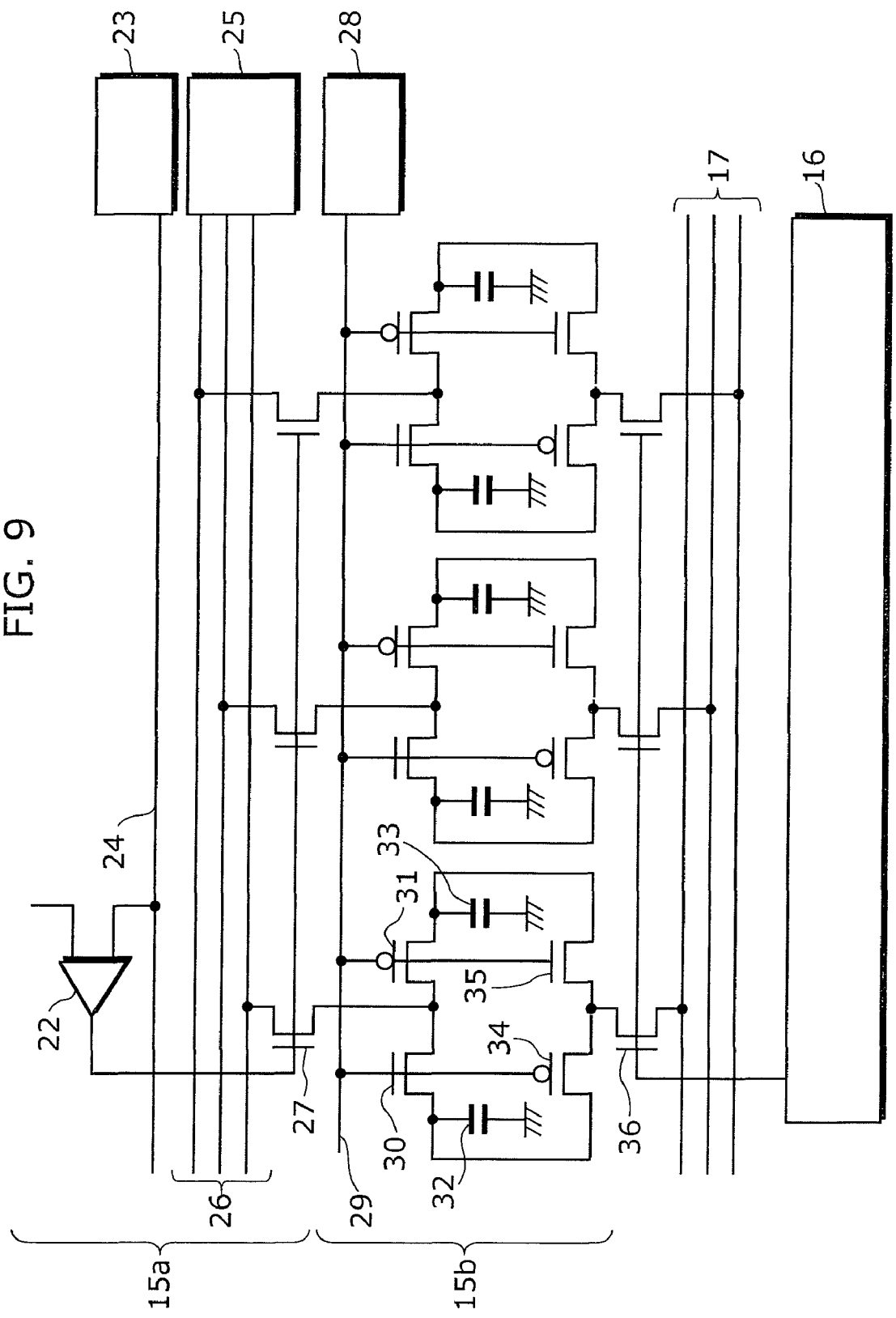
FIG. 9 is a diagram showing a basic configuration of a main portion of the solid-state imaging device.

FIG. 9 is a diagram showing a basic configuration of a main portion of the solid-state imaging device according to the present embodiment. The main portion is a circuit set which is composed of AD conversion circuits 15a, memory circuits 15b, read switches 36, the data buses 17, and the horizontal scan circuit 16.

The AD conversion circuits 15a and the memory circuits 15b are inner components of the ADC 15. The read switches 36, the data buses 17, and the horizontal scan circuit 16 constitutes a horizontal transfer circuit.

FIG. 9 shows a circuit corresponding to one column of the circuit set in the case where the AD conversion circuits 15a are single-slope integration analog-digital conversion circuits, and each digital signal is represented by three bits.

Note that another circuit set which includes the ADC 19, data buses 21, and horizontal scan circuit 20 is configured in the same manner as in the circuit set described above. For the sake of convenience, the above-described circuit set will be referred to as a lower structure, and the other circuit set will be referred to as an upper structure.

Each AD conversion circuit 15a is made up of a comparator 22, a ramp generator 23 which generates a single-slope ramp waveform, a signal line 24 which transmits the ramp waveform, a counter circuit 25 which generates a 3-bit counter code, signal lines 26 which transmit the counter code, and transfer switches 27 whose gates are connected to the output of the comparator 22. The transfer switches 27 are provided corresponding to bits of the counter code.

Each memory circuit 15b has memories 32 and 33 which store a digital signal as a result of AD conversion in the corresponding AD conversion circuit 15a, input selection switches 30 which connect the transfer switches 27 and memories 32, input selection switches 31 which connect the transfer switches 27 and memories 33, output selection switches 34 which connect the memories 32 and read switches 36, and output selection switches 35 which connect the memories 33 and read switches 36. The circuit elements of each type are provided corresponding to the bits of the counter code.

The memory circuit 15b also has a switching control circuit 28 which generates a switch control signal that reverses with processing for each row and a signal line 29 which transfers the switch control signal.

As shown in FIG. 9 by way of example, the input selection switches 30 and output selection switches 35 are realized by normally open field-effect transistors (FETs), and the input selection switches 31 and output selection switches 34 are realized by normally closed FETs. These switches are commonly controlled by the switch control signal.

Note that the switch control circuit 28 may, of course, generate a plurality of switch control signals and individually supply the signals to the switches. In this case, all of the input selection switches 30 and 31 and output selection switches 34 and 35 can also be realized by normally open FETs or normally closed FETs.

With this configuration, the input selection switches 30 and 31 are alternatively and alternately turned on with processing for each row. One of the output selection switches 34 and the output selection switches 35, i.e., ones connected to the memories other than the memories connected to the input selection switches to be turned on are turned on.

This makes it possible to output, from the memories 33, digital signals for an even-numbered one of the rows which are stored therein while storing digital signals for an odd-numbered one in the memories 32 and then output, from the memories 32, the digital signals for the odd-numbered row stored therein while storing digital signals for another even-numbered one in the memories 33.

The read switches 36 are turned on by a scan signal from the horizontal scan circuit 16 and output, to the data buses 17, digital signals in the memories connected to ones of the output selection switches which are on. A scan signal is sequentially outputted from the horizontal scan circuit 16 to the columns, and thereby digital signals in the columns are sequentially transferred through the data buses 17 one column at a time.

Figure 10:
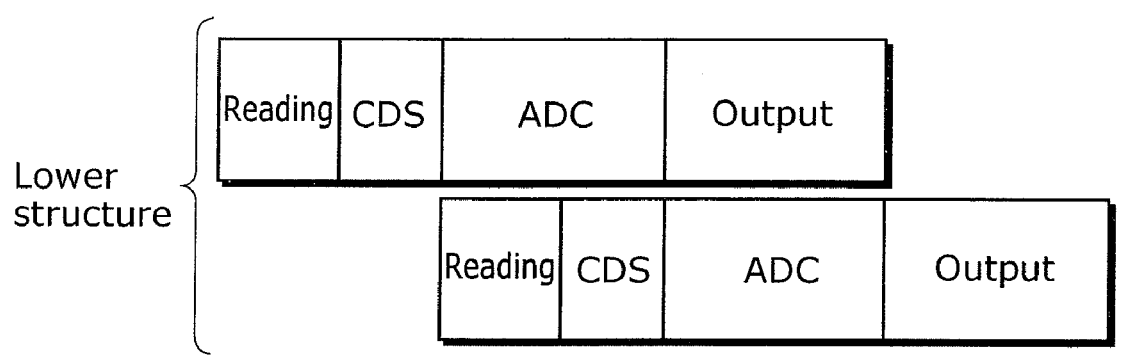
FIG. 10 is a timing chart for explaining the operation timing for the main portion.

FIG. 10 is a timing chart for explaining operation timing for a lower structure described here. Two belts indicate times when series of operations for different odd-numbered ones of the rows (e.g., the first and third rows), i.e., reading of analog signals from the pixel circuits in the different rows (reading), noise removal by the CDSs (CDS), analog-digital conversion of the signals by the ADCs (ADC), and output of digital signals obtained after the conversion (output) are performed. A direction from left to right in FIG. 10 corresponds to the passage of time.

Figure 4:
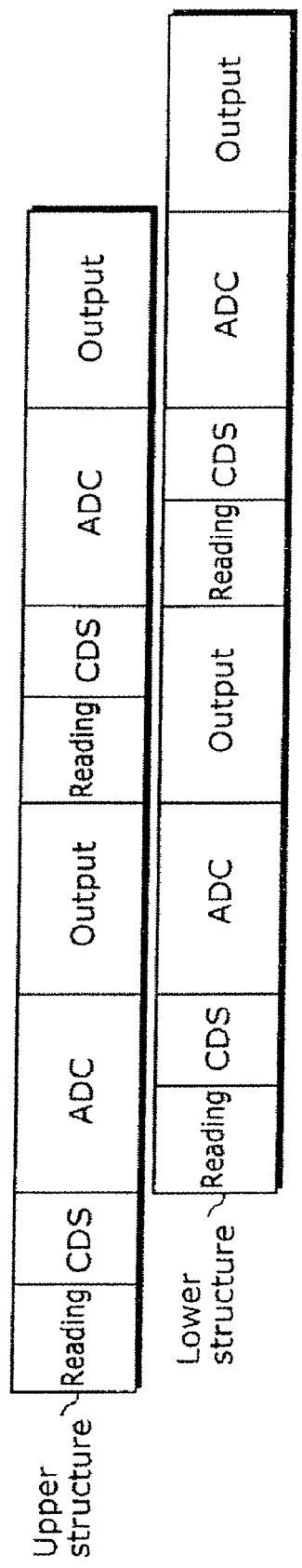
FIG. 4 is a timing chart for explaining operation timing for the conventional solid-state imaging device.
Figure 5:
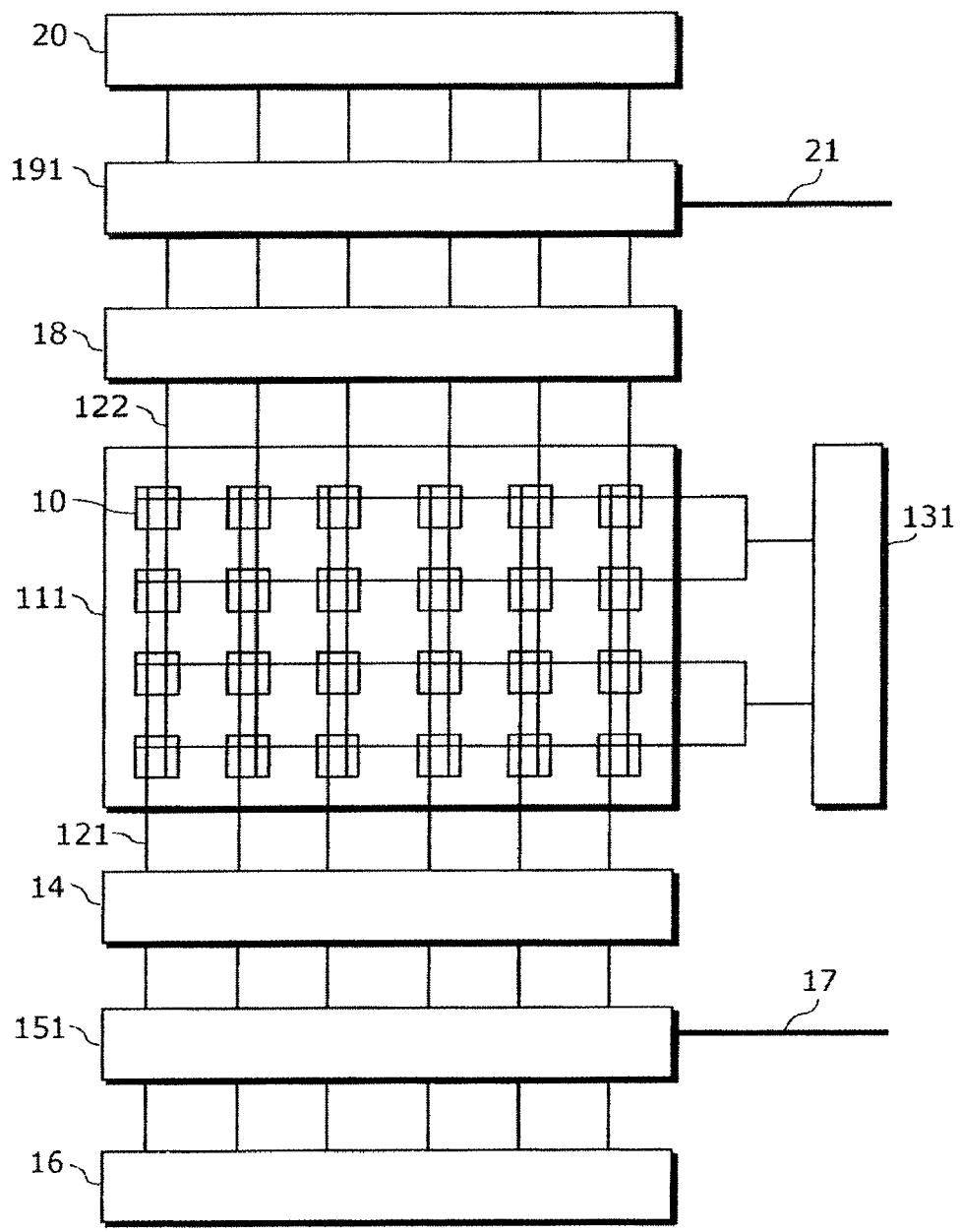
FIG. 5 is a block diagram showing a functional configuration of another conventional solid-state imaging device.
Figure 6:
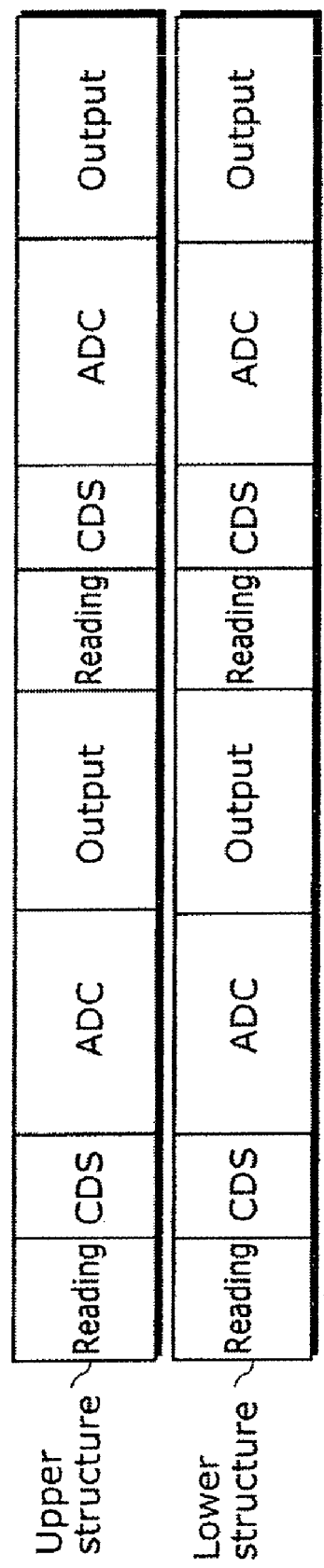
FIG. 6 is a timing chart for explaining the operation timing for the conventional solid-state imaging device.
Figure 7:
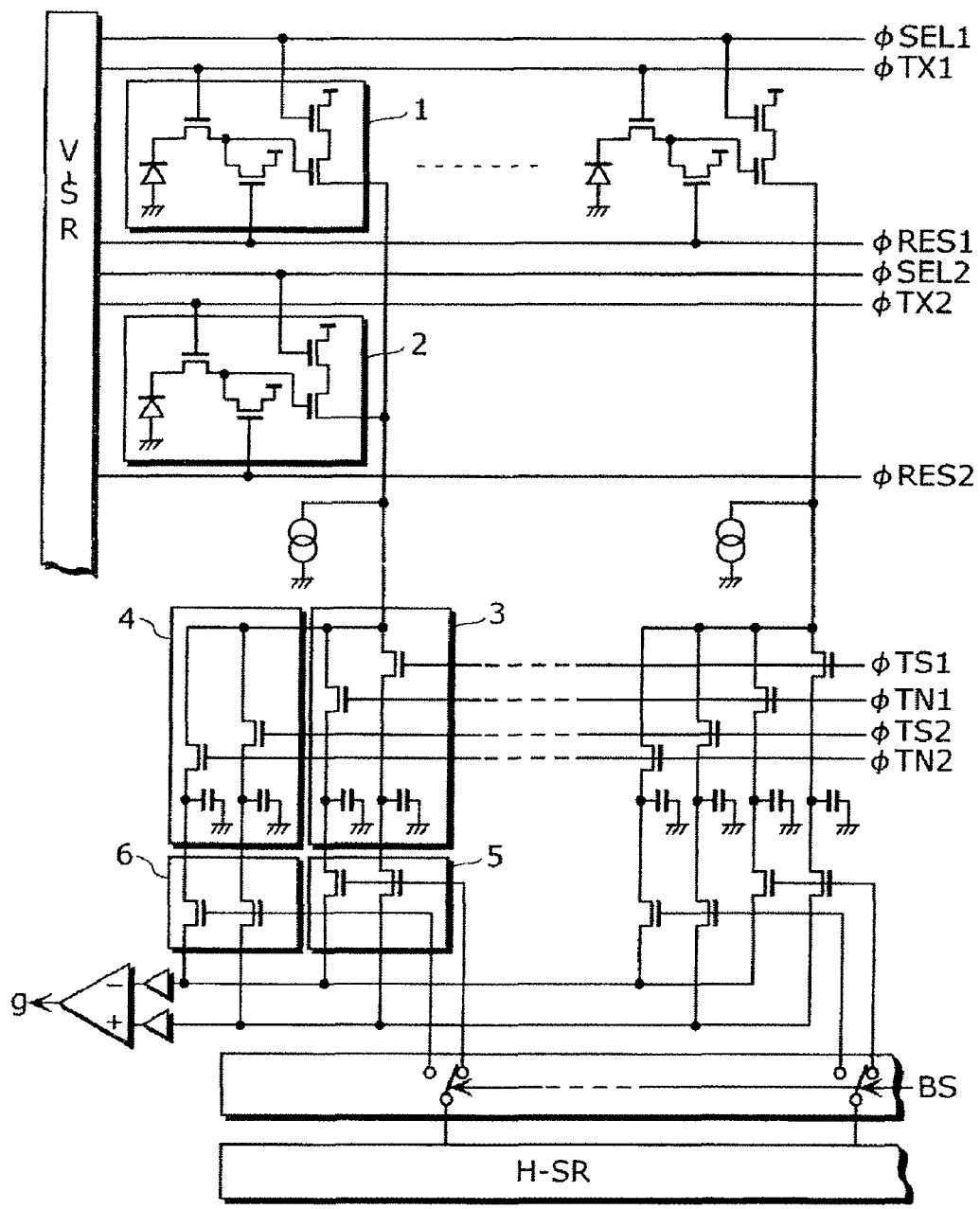
FIG. 7 is a circuit diagram showing a configuration of still another conventional solid-state imaging device.

Attention focused on the fact that FIG. 10 shows only the operation of the lower structure reveals that operation timing equivalent to that (see FIG. 4) realized using the two ADCs in the conventional technique is realized using one ADC and the memory circuits 15b.

Figure 1:
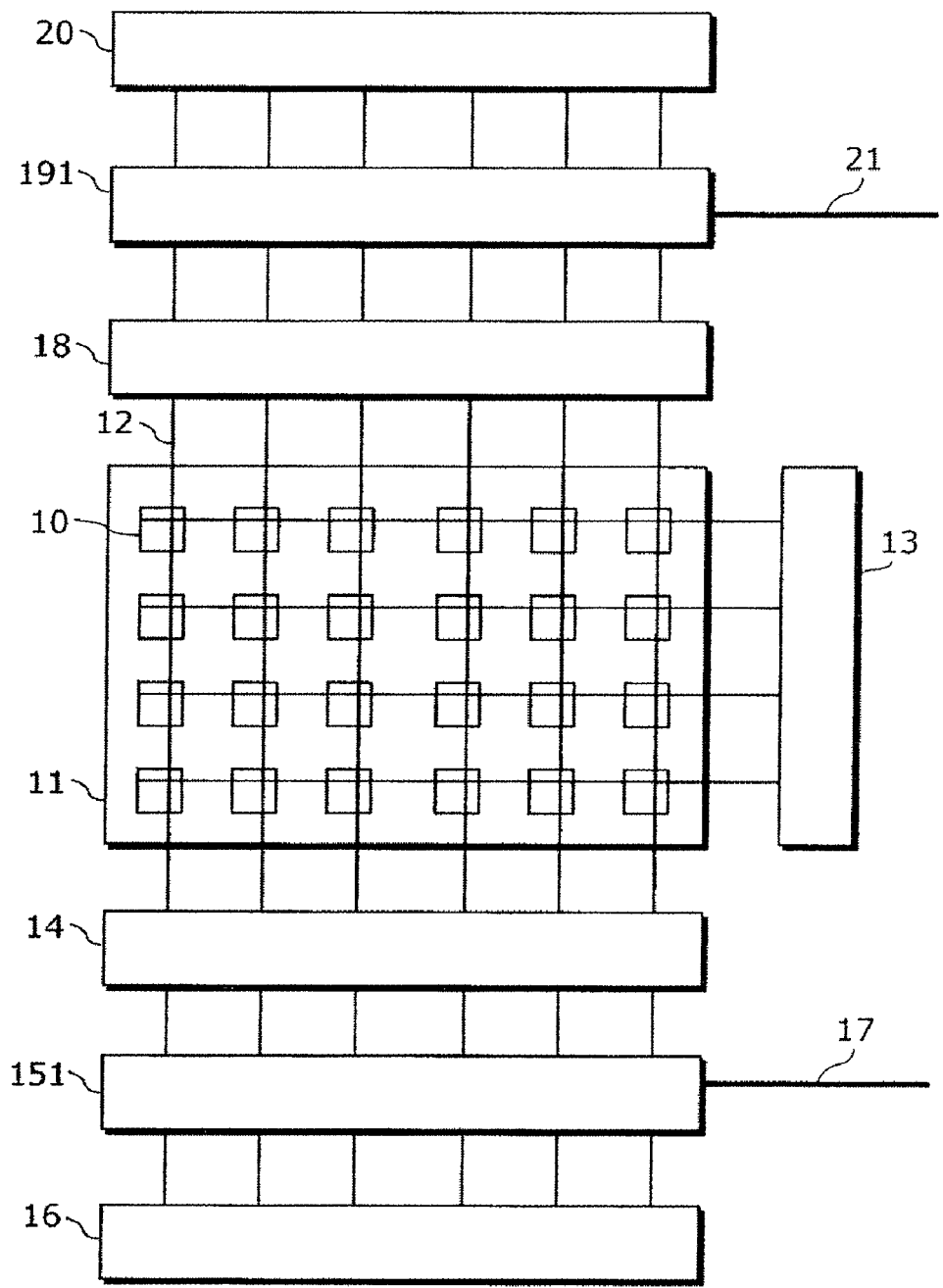
FIG. 1 is a block diagram showing a functional configuration of a conventional solid-state imaging device.
Figure 2:
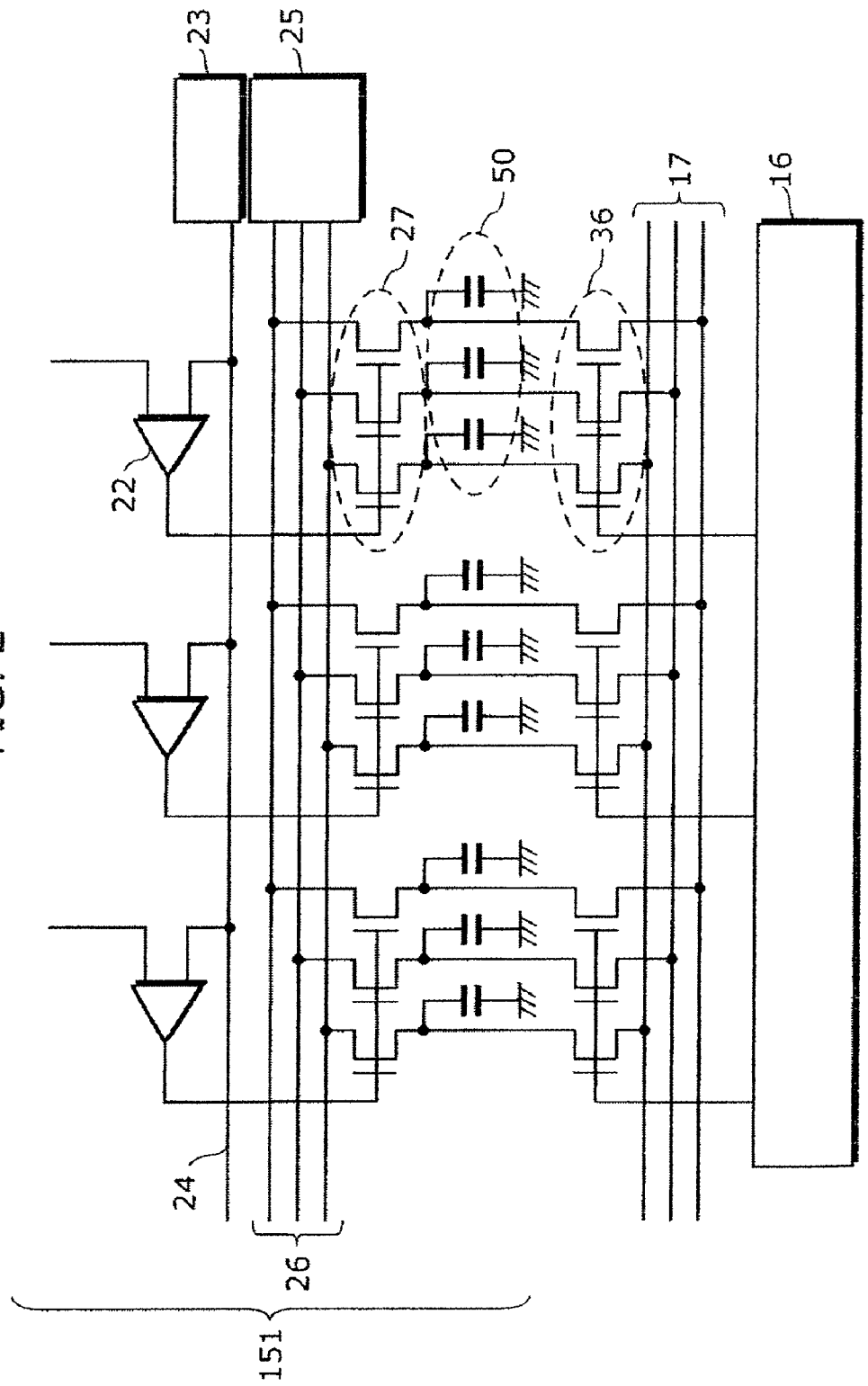
FIG. 2 is a diagram showing a basic circuit configuration of an ADC in the conventional solid-state imaging device.
Figure 3:
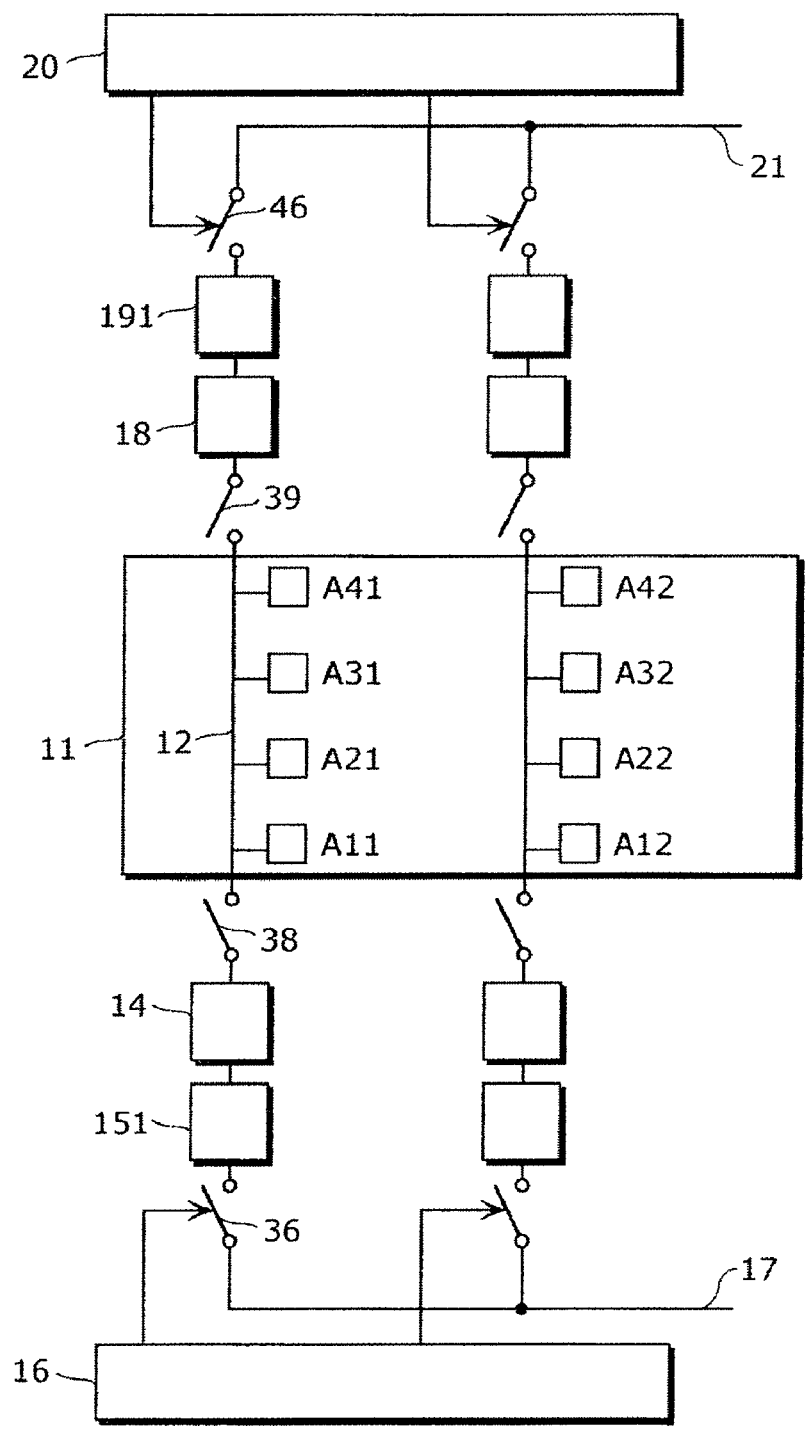
FIG. 3 is a view for conceptually explaining operation of the conventional solid-state imaging device.

In one of the structures according to the conventional technique, including one ADC, only one memory (the memory 50 in FIG. 2) is provided for each column as a memory which stores a digital signal as an AD conversion result. Accordingly, the next AD conversion cannot be started until transfer of digital signals in all columns through the data buses 17 is completed.

In contrast to this, according to the lower structure described here, a process of storing digital signals as AD conversion results in the memories on one side and a process of transferring other digital signals stored in advance in the memories on the other side through the data buses 17 are continuously performed in parallel while interchanging roles of the memories on the one side and those on the other side. This operation realizes operation timing equivalent to that of the conventional technique with a simpler configuration.

In addition, as shown in FIG. 10, immediately after noise removal for an odd-numbered one of the rows is completed, and AD conversion starts, reading of analog signals from another odd-numbered one starts to prepare for the next AD conversion. This allows the lower structure to increase an operating rate of the ADC and perform high-speed processing.

The above-described operation is performed by, e.g., memory circuits provided in the CDS 14 corresponding to the columns, each of which includes two input selection switches, two memories, and two output selection switches, like the memory circuit 15b shown in FIG. 9.

More specifically, the operation refers to an operation of performing, in parallel, a process of reading out analog signals from the pixel circuits in one of the rows to the memories on one side and performing noise removal on the analog signals and a process of outputting analog signals from the pixel circuits in another one which have been subjected to noise removal and are stored in the memories on the other side to the ADC while interchanging the roles of the memories on the one side and those on the other side, in the memory circuits provided in the CDS 14.

Figure 11:
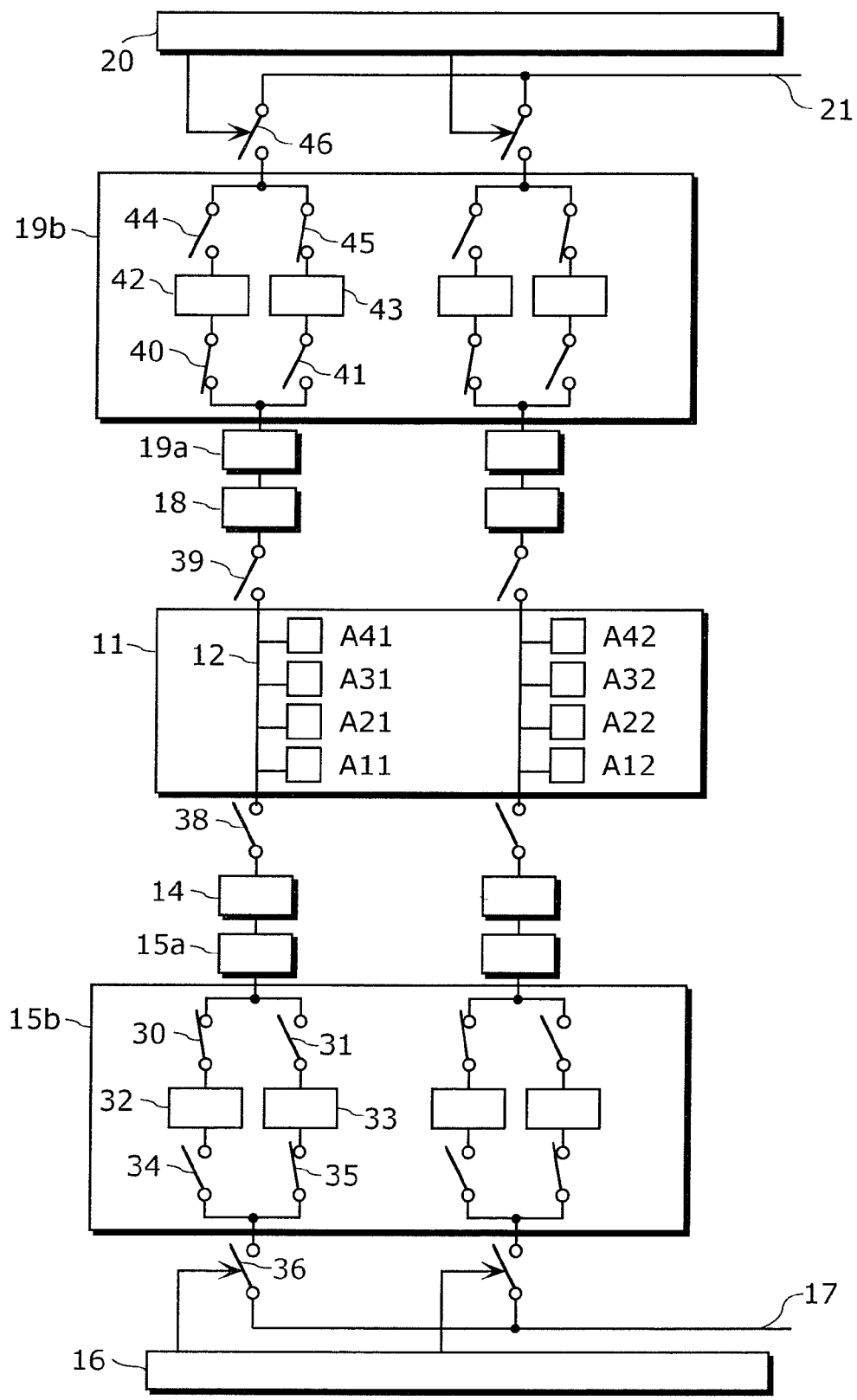
FIG. 11 is a diagram for conceptually explaining the operation of the solid-state imaging device.

FIG. 11 is a diagram for conceptually explaining operation of the solid-state imaging device according to the present embodiment. FIG. 11 schematically shows circuits corresponding to two of the columns of the solid-state imaging device shown in FIGS. 8 and 9.

With reference to FIG. 11, the operation of the solid-state imaging device according to the present embodiment will be described in more detail.

A signal is read out from a pixel A11 in the first row (odd-numbered row) and is inputted to the CDS 14 through a switch 38 such as a MOS transistor. A signal is then read out from a pixel A21 in the second row (even-numbered row) and is inputted to the CDS 18 through a switch 39 such as a MOS transistor.

The CDSs 14 and 18 perform noise removal. The signals outputted from the CDSs 14 and 18 are respectively converted into digital signals by the AD conversion circuits 15a and 19a.

Digital signals for the first row are stored in the memories 32 through the input selection switches 30. In parallel with this, digital signals stored in advance in the memories 33 are read out to the data buses 17 through the output selection switches 35 and read switches 36. The read switches 36 are sequentially turned on one column at a time under the control of the horizontal scan circuit 16, and the digital signals in the columns are sequentially read out to the data buses 17.

Similarly, digital signals for the second row are stored in memories 42 through input selection switches 40. In parallel with this, digital signals stored in advance in memories 43 are read out to the data buses 17 through output selection switches 45 and read switches 46. The read switches 46 are sequentially turned on one column at a time under the control of the horizontal scan circuit 20, and the digital signals in the columns are sequentially read out to the data buses 21.

Immediately after the CDS 14 completes noise removal of analog signals for the first row, the pixel circuits in the third row start outputting analog signals. Digital signals obtained after AD-converting the analog signals are stored in the memories 33 through the input selection switches 31. At this time, the digital signals for the first row are allowed to be transferred through the data buses 17. Since the data being transferred are digital values, they are not easily affected by the signal processing performed in parallel or external noise.

Similarly, after the CDS 18 completes noise removal of analog signals for the second row, the pixel circuits in the fourth row start outputting analog signals. Digital signals obtained after AD-converting the analog signals are stored in the memories 43 through the input selection switches 41. At this time, the digital signals for the second row may be being transferred through the data buses 21. Since the data being transferred are digital values, they are not easily affected by the signal processing performed in parallel or external noise.

Figure 12:
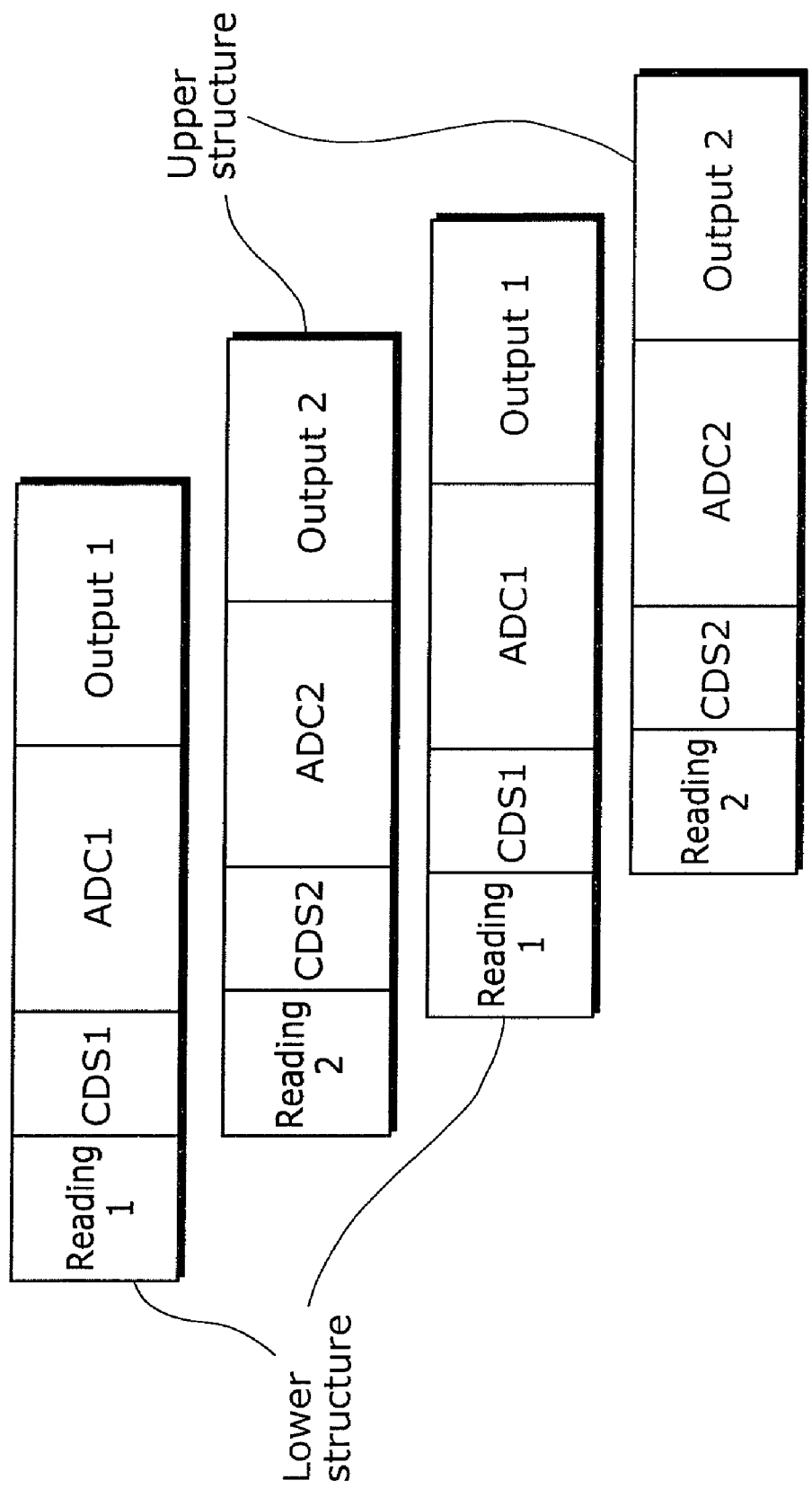
FIG. 12 is a timing chart for explaining the operation timing for two main portions.

FIG. 12 is a timing chart for explaining operation timing for a lower structure in charge of odd-numbered rows and an upper structure in charge of even-numbered rows.

Immediately after noise removal for an odd-numbered one of the rows (CDS 1) is completed in the lower structure, and AD conversion starts, reading for another odd-numbered one (reading 1) starts to prepare for the next AD conversion. This allows the lower structure to increase the operating rate of the ADC circuit and perform high-speed processing.

Similarly, immediately after noise removal for an even-numbered one of the rows (CDS 2) is completed in the upper structure, and AD conversion starts, reading for another even-numbered one (reading 2) starts to prepare for the next AD conversion. This allows the upper structure to increase an operating rate of the ADC circuit and perform high-speed processing.

Second Embodiment

Figure 13:
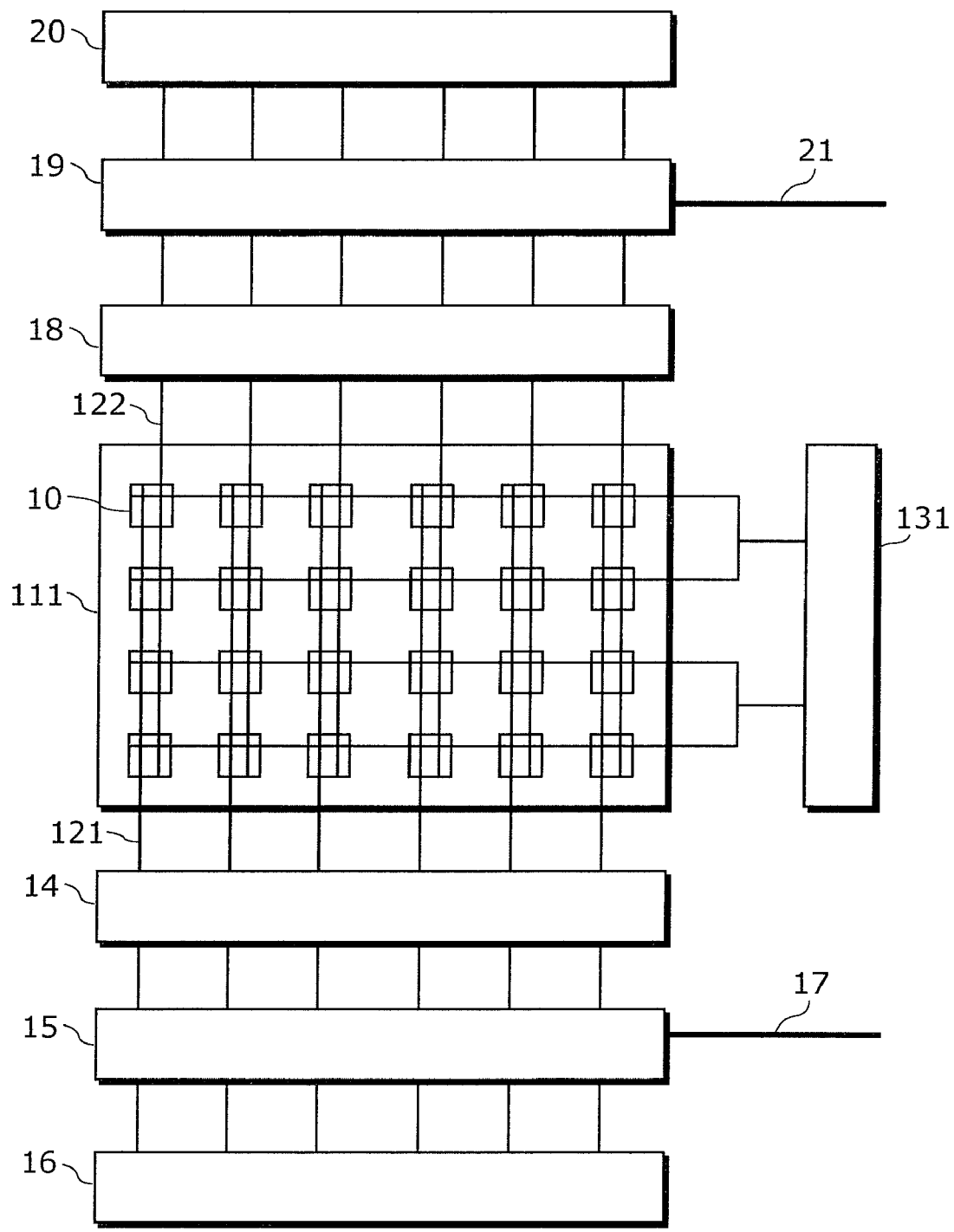
FIG. 13 is a block diagram showing a functional configuration of a solid-state imaging device according to a second embodiment.

FIG. 13 is a block diagram showing a functional configuration of a solid-state imaging device obtained by developing the solid-state imaging device according to the first embodiment such that it can operate at higher speed. For illustrative simplicity, the present embodiment will be described using a 6×4 pixel unit. In the present embodiment, vertical signal lines 121 and 122 are provided for each of columns. For example, the vertical signal lines 121 connect outputs of pixel circuits in odd-numbered rows to a CDS 14 while the vertical signal lines 122 connect outputs of pixel circuits in even-numbered rows to a CDS 18.

A vertical scan circuit 131 simultaneously selects one of the odd-numbered rows and one of the even-numbered rows and simultaneously causes analog signals from the pixel circuits in the odd-numbered row to be read out to a lower structure and ones from the pixel circuits in the even-numbered row to be read out to an upper structure. This allows simultaneous reading for two of the rows in a vertical direction and higher-speed operation.

As in the first embodiment, memory circuits 15b and 19b each of which has two memories are provided in ADCs 15 and 19 in the present embodiment (see FIG. 11).

First, reading for an odd-numbered one of the rows (e.g., a first row) of the pixel unit and an even-numbered one (e.g., a second row) is performed. Analog signals for the first row are inputted to the CDS 14 to be subjected to noise removal, are AD-converted by the ADC 15, and are stored in memories 32 of the ADC 15. Simultaneously with this, analog signals for the second row are inputted to the CDS 18 to be subjected to noise removal, are AD-converted by the ADC 19, and are stored in memories 42 of the ADC 19.

When noise is removed from the analog signals from the pixel circuits in the odd-numbered row (first row) and even-numbered row (second row) by the CDSs, the pixel circuits in a next odd-numbered row (e.g., a third row) and a next even-numbered row (e.g., a fourth row) are controlled to simultaneously output analog signals.

The analog signals in the third row are subjected to noise removal in the CDS 14, are AD-converted by the ADC 15, and are stored in memories 33 of the ADC 15. Simultaneously with this, the analog signals in the fourth row are subjected to noise removal in the CDS 18, are AD-converted by the ADC 19, and are stored in memories 43 of the ADC 19.

Digital signals obtained after the conversion in this manner are sequentially read out from the memory circuits 15b and 19b one column at a time in accordance with scan signals from horizontal scan circuits 16 and 20 and are transferred and outputted to the outside through data buses 17 and 21.

Note that since the solid-state imaging device according to the present embodiment is the same as that according to the first embodiment except that two vertical signal lines are provided for each column and that operation timing is made different to allow simultaneous reading for two rows in a vertical direction, a description of redundant portions will be omitted.

Figure 14:
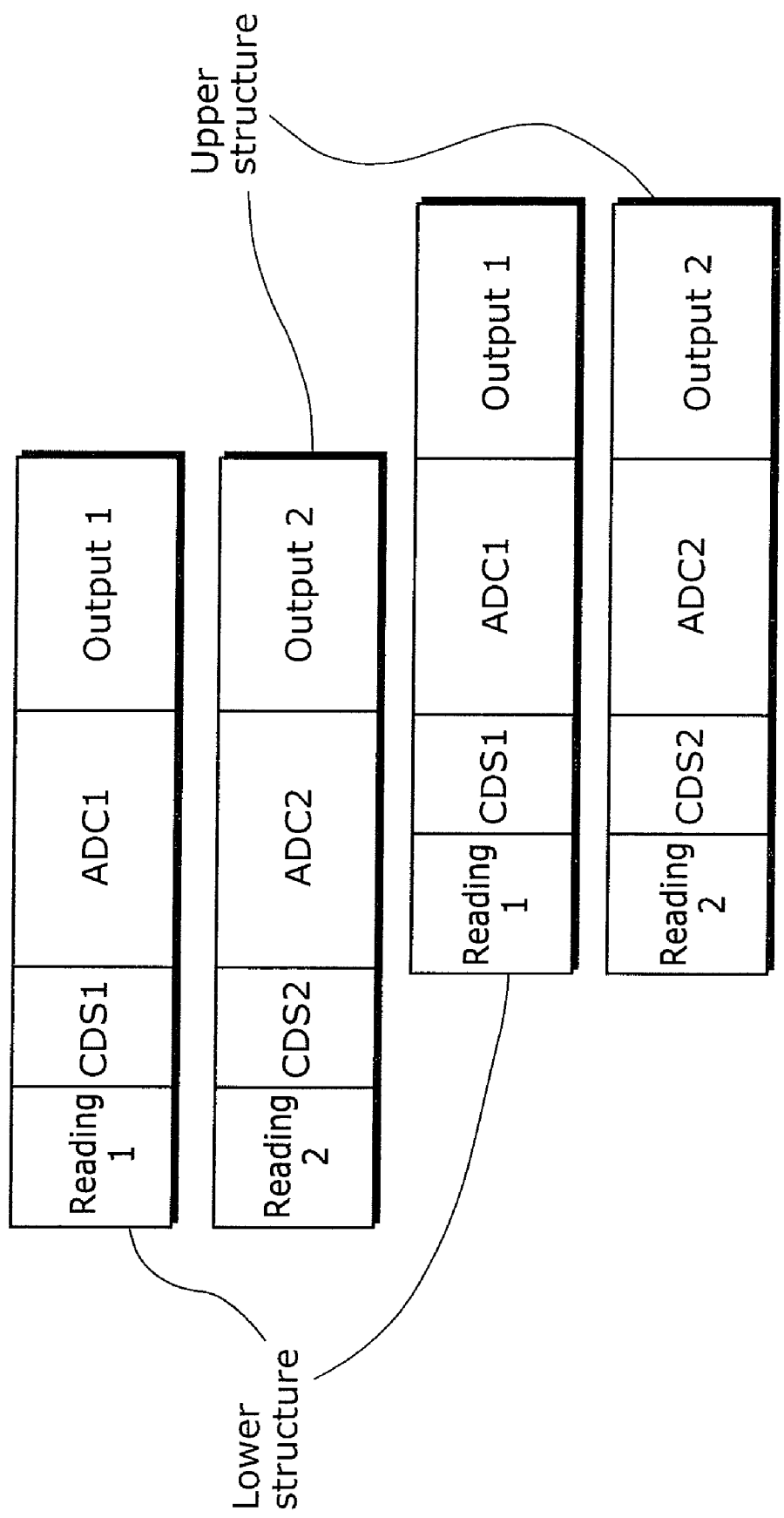
FIG. 14 is a timing chart for explaining the operation timing for the solid-state imaging device.

FIG. 14 is a timing chart for explaining operation timing for the solid-state imaging device according to the present embodiment. Since reading for an odd-numbered row and that for an even-numbered row can be simultaneously performed, the solid-state imaging device according to the present embodiment can operate at higher speed than that according to the first embodiment.

Third Embodiment

The present invention can be not only realized as the solid-state imaging devices described thus far but also as a solid-state imaging system using such a solid-state imaging device.

Figure 15:
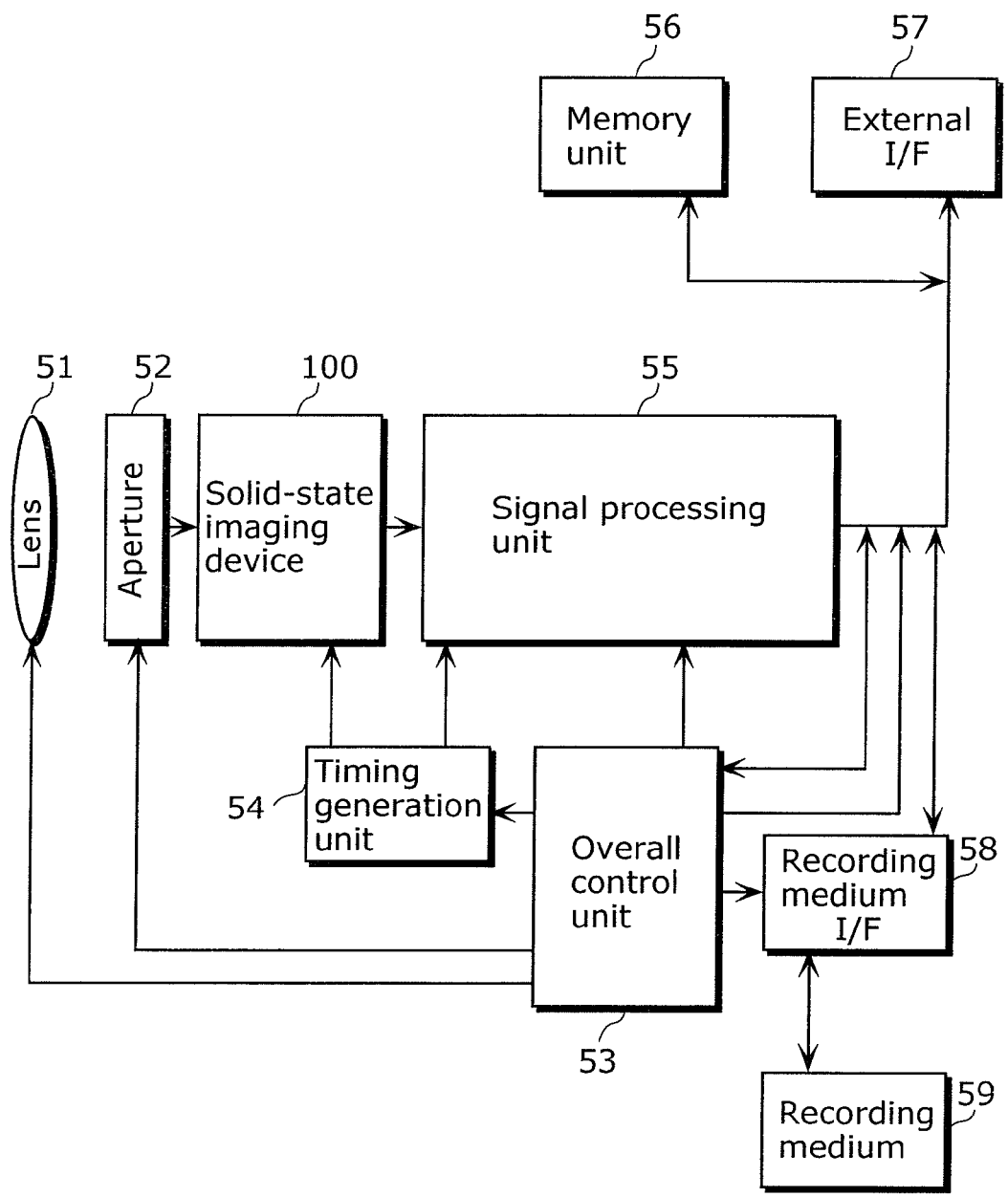
FIG. 15 is a block diagram showing a functional configuration of a solid-state imaging system according to a third embodiment.

FIG. 15 is a block diagram showing an example of a functional configuration of a solid-state imaging system according to a third embodiment.

The solid-state imaging system is a system for imaging an object using the solid-state imaging devices as described thus far and is made up of a lens 51, an aperture 52, a solid-state imaging device 100, an overall control unit 53, a timing generation unit 54, a signal processing unit 55, a memory unit 56, an external Interface (I/F) 57, a recording medium I/F 58, and a recording medium 59. The solid-state imaging device 100 corresponds to each of the solid-state imaging devices described thus far.

The lens 51 and the aperture 52 constitute an optical system which forms an object image on the solid-state imaging device 100. The solid-state imaging device 100 outputs, to the signal processing unit 55, digital signals for pixels obtained by imaging the object.

The signal processing unit 55 uses the memory unit 56 as a working memory and generates image data representing the object image by, e.g., subjecting the digital signals for the pixels to predetermined compression processing.

The overall control unit 53 has overall control over the operation of these components. More specifically, the overall control unit 53 achieves desired focus and exposure by adjusting the lens 51 and the aperture 52 according to spatial high-frequency components in an object image and the amount of light, and controls the timing generation unit 54 to generate timing signals for driving the solid-state imaging device 100 and signal processing unit 55.

The generated image data is outputted from the external I/F 57 to an external device through, e.g., a Universal Serial Bus (USB) cable or a wireless Local Area Network (LAN) or is saved to the recording medium 59 such as a Secure Digital (SD) memory card, which is mounted on the recording medium I/F 58. The overall control unit 53 also controls the operation of these components.

The above-described configuration has inherited features of the solid-state imaging device 100. This realizes a solid-state imaging system which has a relatively simple configuration and has improved in effective operating speed without increasing a speed of ADCs.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention is useful for a solid-state imaging device which has an ADC for each of columns in order to achieve speedup and can be used in a digital camera with video capability, digital video camera, or the like.

What is claimed is:

1. A solid-state imaging device, comprising:

a plurality of pixels arranged in a matrix, the matrix defining columns of the plurality of pixels, each of the plurality of pixels outputting an analog signal by performing photoelectric conversion;

a first analog-digital converter and a second analog-digital converter provided for each of the columns, each of which converts a portion of a plurality of analog signals outputted from pixels in a corresponding one of the columns into a plurality of digital signals and sequentially outputs the plurality of digital signals;

a first memory and a second memory provided for each of the columns, each of which includes a plurality of memories and stores one of the plurality of digital signals received from one of the first analog-digital converter and the second analog-digital converter in the corresponding one of the columns in one of the plurality of memories while outputting another of the plurality of digital signals previously received from the one of the first analog-digital converter and the second analog-digital converter in the corresponding one of the columns from another of the plurality of memories in parallel;

a first horizontal transferor connected to the first memory of each of the columns; and a second horizontal transferor connected to the second memory of each of the columns, wherein the plurality of memories is connected in parallel to the one of the first analog-digital converter and the second analog-digital converter in the corresponding one of the columns.

2. The solid-state imaging device according to claim 1, wherein the first memory in each of the columns includes:

a plurality of input selection switches, each of which connects an output of the first analog-digital converter in the corresponding one of the columns to one of the plurality of memories and is selectively turned on; and a plurality of output selection switches, each of which connects one of the plurality of memories to the first horizontal transferor, one of the plurality of output selection switches being turned on, a turned-on output selection switch being connected to one of the plurality of memories other than one of the plurality of memories to which a turned-on input selection switch is connected.

3. The solid-state imaging device according to claim 1, wherein the first analog-digital converter converts analog signals outputted from pixels in a second row, which is different than a first row, into digital signals while digital signals derived from pixels in the first row are sequentially transferred by the first horizontal transferor.

4. The solid-state imaging device according to claim 1, wherein pixels in a first row output analog signals by performing photoelectric conversion while the first analog-digital converter converts analog signals outputted from pixels in a second row, which is different than the first row, into digital signals, and the first analog-digital converter starts converting the analog signals outputted from the pixels in the first row into digital signals immediately after the first analog-digital converter finishes converting the analog signals outputted from the pixels in the second row into the digital signals.

5. The solid-state imaging device according to claim 1, further comprising:
a plurality of circuit sets provided for each of the columns, each including the first horizontal transferor and the first analog-digital converter and the first memory in the corresponding one of the columns,
wherein each of the plurality of circuit sets converts analog signals outputted from pixels in different rows into digital signals and sequentially transfers the digital signals after conversion.

6. The solid-state imaging device according to claim 5, further comprising:
a plurality of vertical signal lines provided for each of the columns, each of which connects respective outputs of pixels in one of the columns and different ones of the plurality of circuit sets,
wherein each of the plurality of circuit sets acquires, in parallel, analog signals outputted from pixels in the different rows via one of the plurality of vertical signal lines, converts the acquired analog signals into digital signals, and sequentially transfers the digital signals after conversion.

7. The solid-state imaging device according to claim 1, wherein the first analog-digital converter comprises a single-slope integration analog-digital converter.

8. The solid-state imaging device according to claim 1, further comprising:
a noise remover provided for each of the columns, which removes noise from the portion of the plurality of analog signals outputted from the pixels in the corresponding one of the columns and outputs the portion of the plurality of analog signals to the first analog-digital converter.

9. An imaging system, comprising:
a solid-state imager according to claim 1;
an optical system which forms an object image on the solid-state imager; and
a signal processor operable to process a signal outputted from the solid-state imager.

10. The solid-state imaging device according to claim 1, wherein the first analog-digital converter converts analog signals outputted from pixels in even rows in the corresponding one of the columns and the second analog-digital converter converts analog signals outputted from pixels in odd rows in the corresponding one of the columns.

* * * * *